(12) United States Patent
Hirade

(10) Patent No.: US 9,299,034 B2
(45) Date of Patent: Mar. 29, 2016

(54) PREDICTING CHANGE-POINTS IN CONTINUOUS TIME-SERIES DATA USING TWO CLASSIFIER STAGES

(71) Applicant: International Business Machines Corporation, Armonk, NY (US)

(72) Inventor: Ryo Hirade, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 14/058,541

(22) Filed: Oct. 21, 2013

(65) Prior Publication Data

US 2014/0136454 A1 May 15, 2014

(30) Foreign Application Priority Data

Nov. 9, 2012 (JP) ................................. 2012-247820

(51) Int. Cl.
*G06N 99/00* (2010.01)
*B60W 30/14* (2006.01)
*F02D 41/26* (2006.01)
(Continued)

(52) U.S. Cl.
CPC ........... *G06N 99/005* (2013.01); *B60W 30/143* (2013.01); *B60W 50/0097* (2013.01); *F02D 41/26* (2013.01); *B60W 20/104* (2013.01);
(Continued)

(58) Field of Classification Search
CPC .................................................... G06N 99/005
See application file for complete search history.

(56) References Cited

U.S. PATENT DOCUMENTS

| 2003/0004692 A1* | 1/2003 | Srivastava | G06F 17/16 702/189 |
|---|---|---|---|
| 2007/0282777 A1* | 12/2007 | Guralnik | G05B 23/0254 706/48 |
| 2008/0031525 A1* | 2/2008 | Yamaguchi | G06K 9/3208 382/216 |

FOREIGN PATENT DOCUMENTS

| JP | 0533714 A | 2/1993 |
| JP | 06117528 A | 4/1994 |

(Continued)

OTHER PUBLICATIONS

L.I. Kuncheva, "Combining Pattern Classifires: Methods and Algorithms," Willy-Interscience, 2004, pp. 1-360.

(Continued)

*Primary Examiner* — Alan Chen
(74) *Attorney, Agent, or Firm* — Cantor Colburn LLP; Keivan Razavi

(57) ABSTRACT

A method for predicting a change-point in continuous time-series data by computer includes accepting an input of continuous time-series data in past w periods; and determining whether or not a change-point in time-series appears in future k periods; wherein determining further includes determining, by a plurality of preliminary classifiers on the basis of the continuous time-series data in the past w periods and their respective preliminary classification rules, whether or not the change-point appears in future (k+i) periods, where i=0, 1, . . . , m; and determining, by a secondary classifier on the basis of determinations made by the plurality of preliminary classifiers and a secondary classification rule, whether or not the change-point appears in future c periods.

13 Claims, 5 Drawing Sheets

(51) Int. Cl.
  *B60W 50/00* (2006.01)
  *F02D 41/28* (2006.01)
  *B60W 20/00* (2006.01)

(52) U.S. Cl.
  CPC .... *B60W2720/103* (2013.01); *F02D 2041/286* (2013.01); *Y02T 10/84* (2013.01) *B60W 2050/0088* (2013.01); *B60W 2050/0089* (2013.01); *B60W 2510/0604* (2013.01); *B60W 2510/0623* (2013.01); *B60W 2520/10* (2013.01); *B60W 2520/105* (2013.01); *B60W 2710/0605* (2013.01); *B60W 2710/0627* (2013.01);

(56) References Cited

FOREIGN PATENT DOCUMENTS

| JP | 2001183150 A | 7/2001 |
| JP | 2005168174 A | 6/2005 |
| JP | 2006232033 A | 9/2006 |
| JP | 2007155643 A | 6/2007 |

OTHER PUBLICATIONS

G. Seni and J. Elder. "Ensemble Methods in Data Mining: Improving Accuracy Though Combining Predictions," Synthesis Lectures on Data Mining and Knowledge Discovery, 2010, pp. 1-127.

* cited by examiner

US 9,299,034 B2

PREDICTING CHANGE-POINTS IN CONTINUOUS TIME-SERIES DATA USING TWO CLASSIFIER STAGES

PRIORITY

This application claims priority to Japanese patent application No. 2012-247820, filed Nov. 9, 2012, and all the benefits accruing therefrom under 35 U.S.C. §119, the contents of which in its entirety are herein incorporated by reference.

BACKGROUND

The present invention relates to information processing technology and, in particular, to a technique to predict change-points in continuous time-series data.

Various techniques to detect change-points (transition points, inflection points) in continuous time-series data have been proposed. Considering industrial applicability, detecting (predicting) change-points in advance may be more advantageous than detecting change-points after they have occurred. In a hybrid motor vehicle, which includes both of an electricity-driven motor and a gasoline engine driven by fossil fuel, for example, various kinds of time-series data (such as the throttle opening angle, the amount of fuel supply to the engine, the speed of the motor vehicle, and acceleration, for example) are available from various sensors. If a symptom of whether the user (driver) is attempting to switch from acceleration to deceleration or from deceleration to acceleration can be detected in advance, fuel efficiency can be improved without impairing drivability.

Exemplary references include: JP5-33714A; JP2006-232033A; JP6-117528A; JP2001-183150A; JP2005-168174A; JP2007-155643A; G. Seni and J. Elder, "Ensemble Methods in Data Mining: Improving Accuracy Through Combining Predictions", Morgan and Claypool Publishers, 2010, and L. I. Kuncheva, "Combining Pattern Classifiers: Methods and Algorithms", Willy-Interscience, 2004.

SUMMARY

In one embodiment, a method for predicting a change-point in continuous time-series data by computer includes accepting an input of continuous time-series data in past w periods; and determining whether or not a change-point in time-series appears in future k periods; wherein determining further includes determining, by a plurality of preliminary classifiers on the basis of the continuous time-series data in the past w periods and their respective preliminary classification rules, whether or not the change-point appears in future (k+i) periods, where i=0, 1, . . ., m; and determining, by a secondary classifier on the basis of determinations made by the plurality of preliminary classifiers and a secondary classification rule, whether or not the change-point appears in future c periods.

In another embodiment, a computer predicting a change-point in continuous time-series data includes means for accepting an input of continuous time-series data in past w periods; and means for determining whether or not a change-point in time-series appears in future k periods; wherein the means for determining further includes a plurality of preliminary classifiers determining, on the basis of the continuous time-series data in the past w periods and their respective preliminary classification rules, whether or not the change-point appears in future (k+i) periods, where i=0, 1, . . ., m; and a secondary classifier determining, on the basis of determinations made by the plurality of preliminary classifiers and a secondary classification rule, whether or not the change-point appear in future c periods.

DETAILED DESCRIPTION

Figure 1:
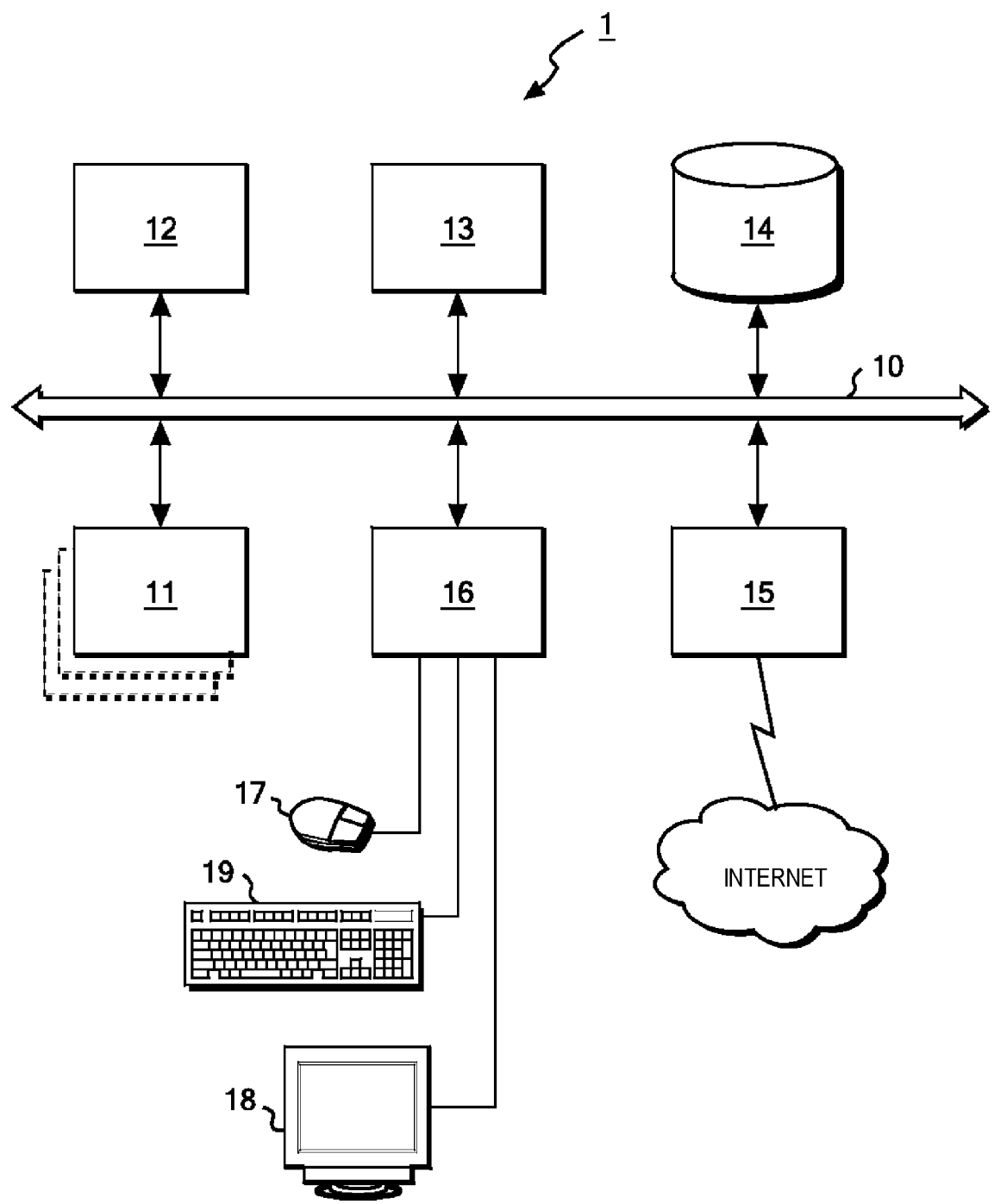
FIG. 1 is a block diagram illustrating a hardware configuration of a computer.

As indicated above, it is not necessarily easy to predict change-points in continuous time-series data which are caused by various factors. It is difficult, for example, to predict a change-point at which a motor vehicle switches from acceleration to deceleration because the change can be attributed to any of various factors, such as the change of a traffic light from green (Go) to red (Stop), reduction of the distance between the motor vehicle and the one ahead, the speed of the motor vehicle reaching a speed limit and other complex factors.

The inventors have conducted intensive studies in light of the problem and have arrived at the idea that although there are various factors that can cause a change-point, the factors are characterized by a time interval between the change-point and its symptom. Embodiments of the present invention provide a technique to predict a change-point in continuous time-series data with a high accuracy.

Embodiments of the present invention provide a method for predicting a change-point in continuous time-series data by computer. The method includes accepting an input of continuous time-series data in past w periods, and determining whether or not a change-point in time-series appears in future k periods. The determining further includes determining, by a plurality of preliminary classifiers on the basis of the continuous time-series data in the past w periods and their respective preliminary classification rules, whether or not the change-point appears in future (c+r) periods, where r=0, 1, . . ., R, and determining, by a secondary classifier on the basis of determinations made by the plurality of preliminary classifiers and a secondary classification rule, whether or not the change-point appear in future c periods.

Here, a single preliminary classifier i of the plurality of preliminary classifiers may be configured to determine only whether or not the change-point appears in a single future (k+i) period.

Each of the preliminary classification rules may be a binary classification algorithm (for example a decision tree, a logistic regression, or a support vector machine). The secondary classification rule may be whether or not a weighted average of an output from each of the preliminary classifiers is greater than or equal to a threshold value.

The method may further include accepting an input of supervised learning data and learning each of the preliminary classification rules on the basis of the supervised learning data. The method may further include accepting an input of supervised learning data and learning the secondary classification rule on the basis of the supervised learning data.

Determining by the plurality of preliminary classifiers whether or not the change-point appears in future (k+i) periods, where i=0, 1, . . ., m, may be configured to determine whether or not the change-point appears in the future (k+i) periods, where i=0, 1, . . . , m, by using data from the continuous time-series data in the past w periods to a current value, a variance over a time window having a size of w, and the average of differences over the time window having a size of w as feature vectors.

Here, the continuous time-series data may be any or all of the throttle opening angle of a motor vehicle, the amount of fuel supplied to an engine of a motor vehicle, the speed of a motor vehicle and the acceleration of a motor vehicle.

When the present invention is viewed as a computer program or a computer system, the computer program or the computer system can include technical features that are virtually identical to the technical features of the present invention viewed as the method described above.

Embodiments of the present invention enable accurate prediction of change-points in continuous time-series data.

The best mode for carrying out embodiments of the present invention will be described below in detail with respect to drawings. However, the embodiments described below are not intended to limit the present invention which is defined in the claims and not all combinations of features described in the embodiment are essential to the inventive solution. The present invention can be carried out in many different modes and should not be interpreted as being limited to the specifics in the descriptions of the embodiment. It should be noted that not all of the combinations described in the embodiment are essential to the inventive solution. Throughout the description of the embodiment, like components or elements are given like reference numerals (unless otherwise stated).

FIG. 1 is a block diagram illustrating a hardware configuration of a personal computer (a computer) 1 relating to the present embodiment. The hardware configuration of the computer 1 includes a (low-speed and high-speed) bus 10 and a CPU (central processing unit) 11, a RAM (random access memory: storage device) 12, a ROM (read only memory: storage device) 13, an HDD (hard disk drive: storage device) 14, a communication interface 15, and an input and output interface 16, which are connected to the bus 10. The hardware configuration further includes a mouse 17, a flat-panel display (display device) 18 and a keyboard 19, which are connected to the input and output interface 16. While the computer 1 has been described as employing a typical personal computer architecture, the computer 1 may include multiple CPUs 11 and HDDs 14 in order to provide a higher data throughput and a higher availability. Any of various other types of computer systems such as a desktop computer can be used as the computer 1.

A software configuration of the computer 1 includes an operating system (OS) which provides basic functions, application software which uses the functions of the OS, and driver software for input and output devices. These pieces of software are loaded onto the RAM 12 along with various kinds of data and executed by the CPU 11, so that the computer 1 in its entirety functions as functional modules illustrated in FIG. 2 and performs a process illustrated in FIG. 3.

Figure 2:
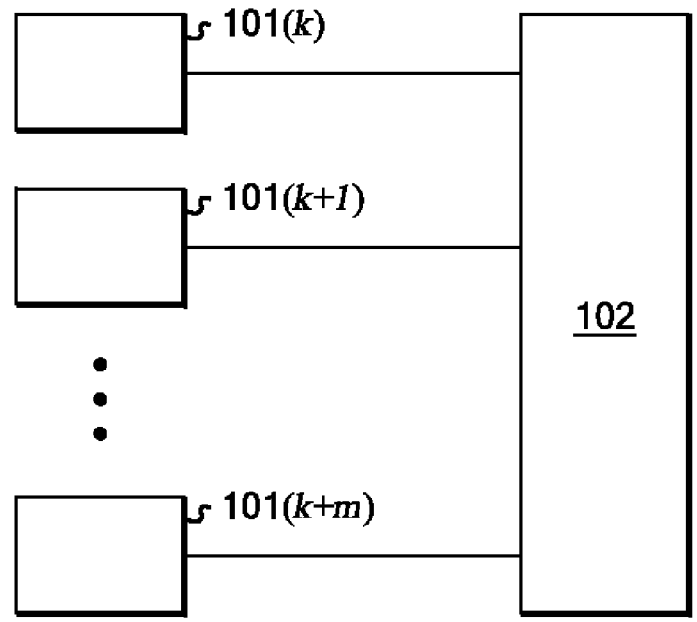
FIG. 2 is a block diagram illustrating functions of a computer.

FIG. 2 is a block diagram illustrating functional modules of the computer 1 relating to an embodiment. The computer 1 in its entirety functions as a plurality of preliminary classification modules 101 (k) to (k+m) and a single secondary classification module 102. Each of the preliminary classification modules 101 (k) to (k+m) includes a decision tree (a preliminary classification rule). The secondary classification module 102 includes a given secondary classification algorithm (a secondary classification rule). Specific functions of these modules will be described later.

Figure 3:
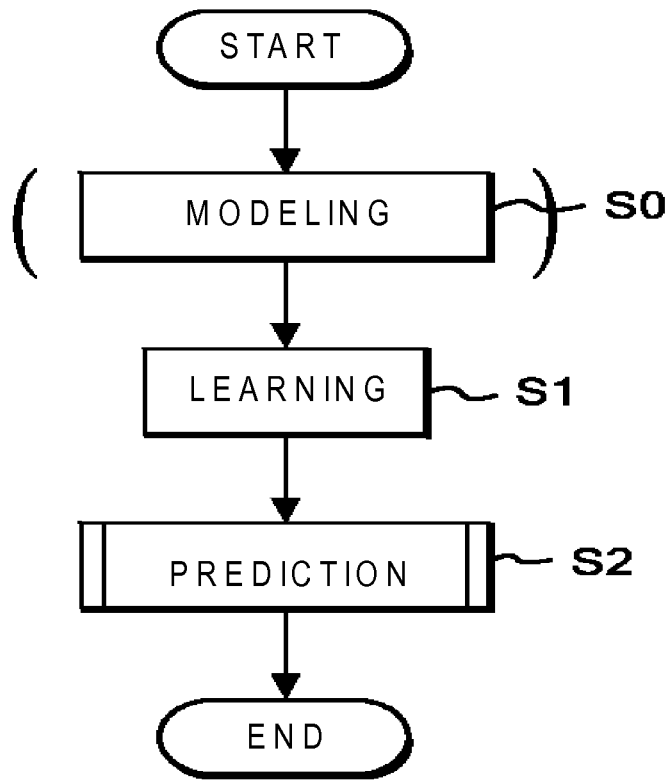
FIG. 3 is a flowchart illustrating a process performed by a computer.

FIG. 3 is a flowchart illustrating a process performed by the computer 1. Broadly speaking, the computer 1 executes a learning phase (block S1) and a prediction phase (block 2).

Prior to describing the modeling learning phase and the prediction phase, how the computer 1 and its classification algorithm is designed and modeled will be described. First, continuous time-series data is given by Eq. (1). Examples of such time-series data may include the throttle opening angle of a motor vehicle, the amount of fuel supply to the engine of the motor vehicle, the speed of the motor vehicle, and the acceleration of the motor vehicle, for example. Label data in Eq. (2) can be assigned to each piece of data to indicate whether a corresponding piece of data is a change-point or not. Whether a piece of data is a change-point or not can be determined by the computer using an existing method or by an expert.

$$X = [x_1, x_2, \ldots, x_N], \quad x_i \in R^d \qquad \text{Eq. 1}$$

$$L = [\ell_1, \ell_2, \ldots, \ell_N], \qquad \text{Eq. 2}$$
$$\ell_i = \begin{cases} 1 & \text{if } x_i \text{ is a change-point} \\ 0 & \text{otherwise,} \end{cases}$$

The problem to be addressed here is to determine whether or not a change-point appears in the period from time t to time t+k−1 (k is a prediction time interval) for a vector xt of given observed time-series data, in other words, to learn the function in Eq. (3). The assumption of the design concept is that a change-point will appear in a prediction time interval from when a symptom of the change-point appeared.

$$F_k^*(x_t) \equiv \begin{cases} 1 & \text{if } \bigvee_{i=t}^{\min(t+k-1,N)} \ell_i, \\ 0 & \text{otherwise,} \end{cases} \qquad \text{Eq. 3}$$

Then a new label set $L^{(k)}$ is considered based on the label set L given above. Each element $l^{(k)}$ is defined by Eq. (4).

$$\ell_n^{(k)} \equiv \bigvee_{i=n}^{\min(n+k-1,N)} \ell_i, \qquad \text{Eq. 4}$$

Figure 4:
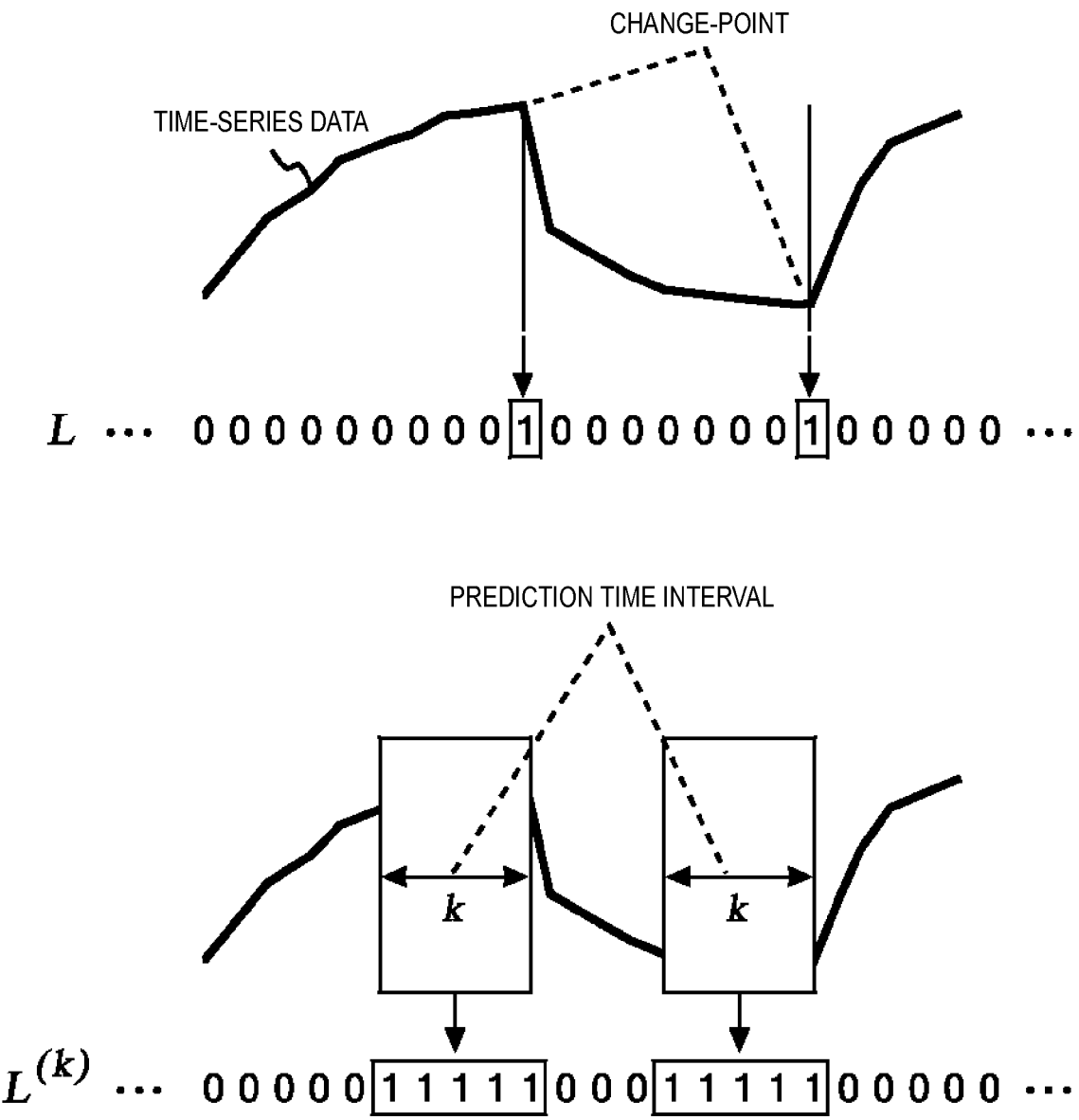
FIG. 4 is a schematic diagram illustrating the relationship between a label set L and a label set $L^{(k)}$.

FIG. 4 illustrates the relationship between label set L and label set $L^{(k)}$. As illustrated, label set $L^{(k)}$ can be generated by assigning "1 s" to (k−1) successive elements preceding an element corresponding to a "1" in label set L. Furthermore, a new data set $D^{(k)}$ shown in Eq. (5) can be introduced from time-series data X given above and label set $L^{(k)}$.

$$D^{(k)} \equiv \{(x_1, l_1^{(k)}), (x_2, l_2^{(k)}), \ldots, (x_N, l_N^{(k)})\} \qquad \text{Eq. 5}$$

Here, the problem to be solved can be formulated as a 2-class classification problem by using data set $D^{(k)}$ as input data. That is, the problem of predicting a change-point in given time-series data can be formulated as a 2-class classification problem.

Figure 5:
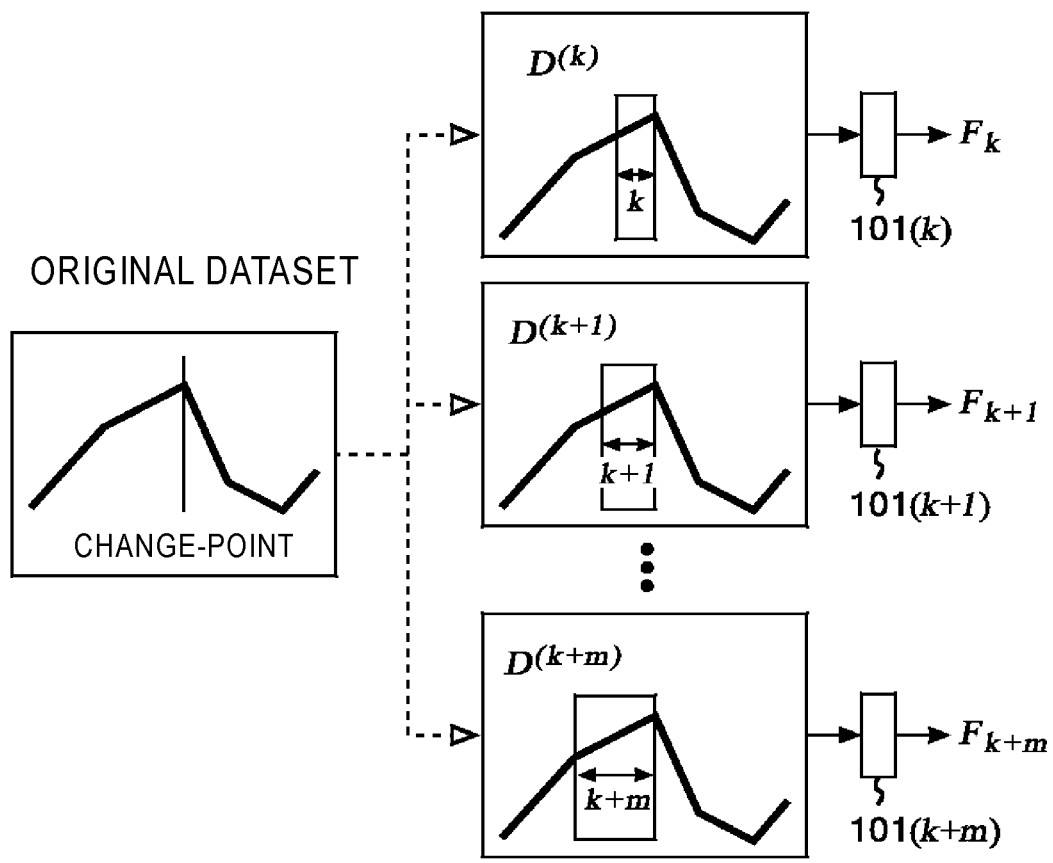
FIG. 5 is a schematic diagram illustrating preliminary classification modules and their input data.
Figure 6:
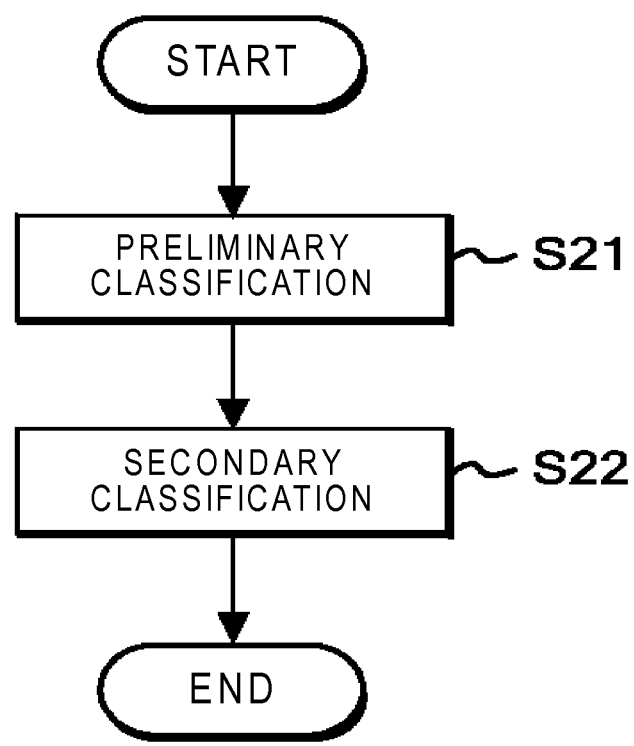
FIG. 6 is a flowchart illustrating a prediction phase.

The present embodiment uses ensemble learning. Each of a plurality of preliminary classification modules (weak classifiers) 101 (k) to (k+m), which have respective different prediction time intervals of k to K+m, determines only whether or not a change-point will appear in a prediction time interval associated with the preliminary classification module. FIG. 5 illustrates preliminary classification modules and data input into the modules. For data $D^{(k+1)}$, for example, a preliminary classification module 100 (k+i) dedicated to the data is provided. The preliminary classification module 100 (k+i) is responsible for determining only whether or not a symptom of a change-point appears in the prediction time interval (k+i) preceding the change-point (the module does not care about the other prediction time intervals) and outputting the result $F_{k+1}$.

$$\overline{F}_{k,m}(x) \equiv \begin{cases} 1 & \text{if } \sum_{i=0}^{m} w_i F_{k+i}(x) \geq b, \\ 0 & \text{otherwise,} \end{cases} \quad \text{Eq. 6}$$

The secondary classification module 102 provides an ultimate output based on a discriminant (a secondary classification rule) shown in Eq. (6), where ωi (i=0, 1, ..., m) represents a weight for an output from each preliminary classification module 101 and b is a threshold value.

Learning phase: Since the problem is formulated as a 2-class classifier problem, which is commonly used, in the present embodiment as has been described above, learning for conventional classifiers can be employed without modifications. That is, supervised learning data can be used to optimize (learn) the parameters of a binary classification algorithm (such as a decision tree, logistic regression, or a support vector machine, for example) to build classifiers. The weak classifiers do not necessarily need to use the same algorithm. Furthermore, the parameter ωi (i=0, 1, ..., m) and the parameter b in Eq. (6) can be optimized by a method such as cross-validation.

Prediction phase: When actual prediction is performed, time-series data X is input into the learned preliminary classification modules 101 (k) to (k+m), which in turn output preliminary classification results $F_k$, $F_{k+1}$, ..., $F_{k+m}$, respectively (block S21). Then the preliminary classification results $F_k$, $F_{k+1}$, ..., $F_{k+m}$ are input into the learned secondary classification module 102, which in turn outputs a secondary classification result $F_{k,m(x)}$ (block S22). Note that the time-series data may be stored in the hard disk 14 in advance or may be sent through a network in real time. The secondary classification result $F_{k,m(x)}$ may also be displayed on the display device 18. While continuous time-series data X in the past w periods is input in the plurality of preliminary classification modules 101 (k) to (k+m) in the present embodiment, the present invention is not limited to this. For example, data from continuous time-series data in the past w periods to the current value, a variance having a size of w over a time window, and the average of differences over a time window having a size of w may be input as feature vectors.

The present invention can be implemented as a hardware embodiment in its entirety, a software embodiment as its entirety, or an embodiment embracing elements of both hardware and software. In one embodiment, the present invention is implemented in software, including, but not limited to, firmware, resident software, microcode, and parser picocode.

Furthermore, the present invention can be implemented as a computer or any instruction executing system or a computer program including program codes or a computer-readable medium that is to be used in association with the computer or the instruction executing system. For purposes of illustration of the present invention, the computer-readable medium may be any device that is capable of containing, storing, communicating, bearing or transmitting a computer program to be used by any instruction executing system, apparatus or device or to be used in association with any instruction executing system, apparatus or device. Specifically, the parsing control module described above constitutes an instruction executing system in that sense or a "computer".

The medium may be an electric, magnetic, optical, electromagnetic, infrared, or semiconductor system (or apparatus or device) or bearing medium. Examples of the computer-readable medium includes a semiconductor or solid-state memory, a magnetic tape, a removable computer diskette, a random access memory (RAM), a read-only memory (ROM), a hard magnetic disk, and an optical disk. Examples of the optical disk at the time of writing include a compact disk read only memory (CD-ROM), a compact disk read/write (CD-RW) memory, and a DVD.

A data processing system suitable for storing and/or executing program codes may include at least one processor directly or indirectly connected to a memory element through a system bus. The memory element may include a cache memory that provides a temporary storage for at least some of the program codes in order to reduce the number of times of read operations required for reading a local memory and a bulk storage device used in the process of actual execution of the program codes and for reading the bulk storage during execution.

The invention claimed is:

1. A method for predicting a change-point in continuous time-series data by computer, the method comprising:
   accepting an input of continuous time-series data in past w periods; and
   determining whether or not a change-point in time-series appears in future k periods by:
   determining, by a plurality of preliminary classifiers on the basis of the continuous time-series data in the past w periods and their respective preliminary classification rules, whether or not the change-point appears in future (k+i) periods, where i=0, 1, . . . , m; and
   determining, by a secondary classifier on the basis of determinations made by the plurality of preliminary classifiers and a secondary classification rule, whether or not the change-point appears in future c periods.

2. The method according to claim 1, wherein a single preliminary classifier i of the plurality of preliminary classifiers determines only whether or not the change-point appears in a single future (k+i) period.

3. The method according to claim 1, wherein each of the preliminary classification rules is a binary classification algorithm.

4. The method according to claim 1, wherein the secondary classification rule is whether or not a weighted average of an output from each of the preliminary classifiers is greater than or equal to a threshold value.

5. The method according to claim 1, further comprising:
   accepting an input of supervised learning data; and
   learning each of the preliminary classification rules on the basis of the supervised learning data.

6. The method according to claim 1, further comprising:
   accepting an input of supervised learning data; and
   learning the secondary classification rule on the basis of the supervised learning data.

7. The method according to claim 1, wherein the determining by the plurality of preliminary classifiers whether or not the change-point appears in future (k+i) periods, where i=0, 1, . . . , m, determines whether or not the change-point appears in the future (k+i), where i=0, 1, ..., m, periods by using data from the continuous time-series data in the past w periods to a current value, a variance over a time window having a size of w, and an average of differences over the time window having a size of w as feature vectors.

8. The method according to claim 1, wherein the continuous time-series data is a throttle opening angle of a motor vehicle.

9. The method according to claim 1, wherein the continuous time-series data is an amount of fuel supplied to an engine of a motor vehicle.

10. The method according to claim 1, wherein the continuous time-series data is speed of a motor vehicle.

11. The method according to claim 1, wherein the continuous time-series data is acceleration of a motor vehicle.

12. A computer program product executed by a computer to cause the computer to perform the method according to claim 1.

13. A computer predicting a change-point in continuous time-series data, the computer comprising:
    means for accepting an input of continuous time-series data in past w periods; and
    means for determining whether or not a change-point in time-series appears in future k periods;
    wherein the means for determining further comprises:
    a plurality of preliminary classifiers determining, on the basis of the continuous time-series data in the past w periods and their respective preliminary classification rules, whether or not the change-point appears in future (k+i) periods, where i=0, 1, ..., m; and
    a secondary classifier determining, on the basis of determinations made by the plurality of preliminary classifiers and a secondary classification rule, whether or not the change-point appear in future c periods.

* * * * *